United States Patent
Teratani et al.

(10) Patent No.: US 7,422,992 B2
(45) Date of Patent: Sep. 9, 2008

(54) ALUMINUM NITRIDE SINTERED BODY, SEMICONDUCTOR MANUFACTURING MEMBER, AND METHOD OF MANUFACTURING ALUMINUM NITRIDE SINTERED BODY

(75) Inventors: Naomi Teratani, Nagoya (JP); Naohito Yamada, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 166 days.

(21) Appl. No.: 11/378,974

(22) Filed: Mar. 17, 2006

(65) Prior Publication Data

US 2006/0217259 A1  Sep. 28, 2006

(30) Foreign Application Priority Data

Mar. 25, 2005 (JP) ............................. 2005-090181

(51) Int. Cl.
*C04B 35/581* (2006.01)

(52) U.S. Cl. .................................................... 501/98.5

(58) Field of Classification Search ................. 501/98.5
See application file for complete search history.

(56) References Cited

U.S. PATENT DOCUMENTS

| 5,998,321 | A  | * | 12/1999 | Katsuda et al. | ............ 501/98.4 |
| 6,423,400 | B1 | * | 7/2002  | Yushio et al.  | ................ 428/210 |
| 6,800,576 | B2 | * | 10/2004 | Katsuda et al. | ............ 501/98.4 |

FOREIGN PATENT DOCUMENTS

| EP | 0 271 353     | 6/1988  |
| EP | 0 393 524     | 10/1990 |
| JP | 02-275765     | 11/1990 |
| JP | 2002-220282 A1| 8/2002  |
| KR | 1990-0004488  | 6/1990  |

* cited by examiner

*Primary Examiner*—Karl E Group
(74) *Attorney, Agent, or Firm*—Burr & Brown

(57) ABSTRACT

An aluminum nitride sintered body is provided, which essentially contains aluminum nitride, 0.4 to 2.5 wt % magnesium and 2.0 to 5.0 wt % yttrium. The aluminum nitride sintered body has an average particle size of not more than 1.0 μm.

6 Claims, 1 Drawing Sheet

ALUMINUM NITRIDE SINTERED BODY, SEMICONDUCTOR MANUFACTURING MEMBER, AND METHOD OF MANUFACTURING ALUMINUM NITRIDE SINTERED BODY

CROSS REFERENCE TO RELATED APPLICATIONS

This application is based upon and claims the benefit of priority from prior Japanese Patent Application P2005-090181 filed on Mar. 25, 2005; the entire contents of which are incorporated by reference herein.

BACKGROUND OF THE INVENTION

1. Field of the Invention

The present invention relates to an aluminum nitride sintered body, a semiconductor manufacturing member, and a method of manufacturing the aluminum nitride sintered body.

2. Description of the Related Art

Heretofore, in semiconductor manufacturing processes and liquid crystal manufacturing processes, an electrostatic chuck is used which clamps and holds a semiconductor substrate or a glass substrate. Electrostatic chucks include one which clamps a substrate using a Coulomb force and one which clamps a substrate using a Johnson-Rahbek force. The Coulomb force is an electrostatic clamping force generated between a substrate mounted on a surface of a dielectric material layer of the electrostatic chuck and an electrode of the electrostatic chuck. In the electrostatic chuck, high volume resistance is needed in order to obtain an electrostatic force for clamping the substrate. For example, in the electrostatic chuck using the Coulomb force, alumina, which is a material having a high volume resistivity, is used as a material for a base plate.

However, general alumina sintered bodies have thermal conductivities as low as approximately 20 W/mK. Very-high-purity, high-thermal-conductivity ones have thermal conductivities of approximately 30 W/mK. Even single crystal ones have thermal conductivities of approximately 40 W/mK and cannot sufficiently satisfy thermal conductivities required for, for example, electrostatic chucks.

Accordingly, aluminum nitride, which is a material having high volume resistance while satisfying thermal conductivity, is being used as the material for the base plate (e.g., Japanese Patent Laid-open Publication No. 2002-220282).

However, recently, aluminum nitride sintered bodies used in semiconductor manufacturing equipment tend to be increasingly exposed to high-temperature environments. For example, base temperature ranges are becoming wide in etching processes, high-density plasma CVD, and the like. With this, the material is desired, which maintains the high volume resistivity even in high-temperature environments.

Furthermore, in the electrostatic chuck using the Coulomb force, a high voltage is applied to the base plate in order to generate the Coulomb force. Accordingly, the material is desired which maintains the high volume resistivity even in high-voltage environments.

If no particular innovation is made, the aluminum nitride sintered body generally has a volume resistivity of not less than $1 \times 10^{15}$ Ωcm during voltage application of 500 V/mm at room temperature, thus having high volume resistance. However, for example, in a temperature region of 200° C., which is an operating environment, in the case of voltage application of 2 kV/mm, the volume resistivity is not more than $1 \times 10^{14}$ Ωcm. Thus, there is a problem that the volume resistivity decreases in the high-temperature, high-voltage environment. According to this, for example, when the aluminum nitride sintered body is used as the electrostatic chuck, electric charges remain on the surface of the electrostatic chuck even after voltage application is stopped, and the substrate is not immediately detached therefrom. Thus, there is apprehension that responding characteristics in attachment and detachment may be considerably affected.

SUMMARY OF THE INVENTION

A first aspect of the present invention is to provide an aluminum nitride sintered body essentially, including, aluminum nitride, containing 0.4 to 2.5 wt % magnesium and 2.0 to 5.0 wt % yttrium, and having an average particle size of not more than 1.0 μm.

A second aspect of the present invention is to provide a method of manufacturing an aluminum nitride sintered body, including, molding raw material powder into a compact, and sintering the compact at a temperature of not more than 1750° C., the raw material powder containing aluminum nitride raw material, 0.5 to 3.0 mol % magnesium on a magnesium oxide basis, and 0.5 to 1.5 mol % yttrium on a yttrium oxide basis.

A third aspect of the present invention is to provide a semiconductor manufacturing member, including, an aluminum nitride sintered body essentially containing aluminum nitride, containing 0.4 to 2.5 wt % magnesium and 2.0 to 5.0 wt % yttrium, and having an average particle size of not more than 1.0 μm, the aluminum nitride sintered body constituting at least part of the semiconductor manufacturing member.

DETAILED DESCRIPTION OF THE INVENTION

Figure 1:
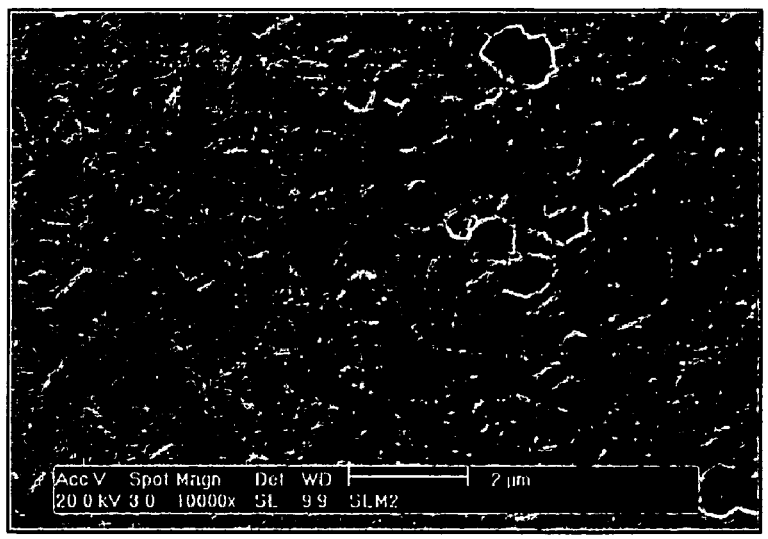
FIG. 1 is a photograph substituted for a drawing which shows the microstructure of an aluminum nitride sintered body of example 1.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

(Aluminum nitride Sintered Body)

An aluminum nitride sintered body of this embodiment essentially contains aluminum nitride, contains 0.4 to 2.5 wt % magnesium and 2.0 to 5.0 wt % yttrium, and have an average particle size of not more than 1.0 μm. If the amount of magnesium contained in the aluminum nitride sintered body is less than 0.4 wt %, a volume resistivity decreases. On the other hand, if the amount of magnesium contained in the aluminum nitride sintered body exceeds 2.5 wt %, the aluminum nitride sintered body cannot be obtained which has high volume resistance in a high-temperature, high-voltage environment. Further, if the amount of magnesium contained in the aluminum nitride sintered body exceeds 2.5 wt %, a thermal conductivity greatly decreases. Thus, a feature of aluminum nitride in which the thermal conductivity is high is weakened. Moreover, if the amount of yttrium contained in the aluminum nitride sintered body is less than 2.0 wt %, sintering becomes incomplete in sintering at a low temperature, e.g., 1750° C. or less. Thus, a sufficiently dense sintered body cannot be obtained. On the other hand, if the amount of yttrium contained in the aluminum nitride sintered body exceeds 5.0 wt %, the volume resistivity decreases. If an average particle size of the aluminum nitride sintered body exceeds 1.0 µm, the volume resistivity decreases.

Accordingly, the aluminum nitride sintered body having high volume resistance in the high-temperature, high-voltage environment can be obtained by the aluminum nitride sintered body containing appropriate amounts of magnesium and yttrium, i.e., magnesium and yttrium of amounts in the above-described ranges, and having the average particle size of not more than 1.0 µm. Specifically, the aluminum nitride sintered body having high volume resistance in the high-temperature, high-voltage environment can be obtained by a formation of a solid solution of magnesium in aluminum nitride particles in a state in which magnesium is alone or in a state in which at least magnesium and oxygen are included in the aluminum nitride sintered body, and by a existence of a grain boundary phase containing yttrium in the aluminum nitride sintered body.

Further, the aluminum nitride sintered body can be blackened by causing the aluminum nitride sintered body to contain one or more kinds of transition metal elements selected from groups IVA, VA, VIA, VIIA, and VIIIA of a periodic table. This makes it possible to increase a radiation efficiency of the aluminum nitride sintered body. As the transition metal elements, Ti, Zr, Hf, V, Nb, Ta, Cr, Mo, W, Mn, Fe, Co, and Ni are suitable. In particular, Ti, Mo, and W are preferable. It should be noted, however, that the total amount of transition metal element constituents in a raw material powder for the aluminum nitride sintered body is preferably not more than 0.3 mol % on an oxide basis. According to this, if the total amount of transition metal element constituents in the raw material powder for the aluminum nitride sintered body exceeds 0.3%, sufficient blackening can be performed. However, for example, there is a possibility that a large amount of nitride having low resistance may be generated to cause a decrease in the volume resistivity of the aluminum nitride sintered body.

Moreover, in the case where high priority is given to increasing the volume resistivity of the aluminum nitride sintered body, the amount of magnesium contained in the aluminum nitride sintered body is preferably 0.5 to 2.5 wt %. On the other hand, in the case where high priority is given to increasing the thermal conductivity, the amount of magnesium contained in the aluminum nitride sintered body is preferably 0.4 to 1.5 wt %.

An a-axis length of lattice parameters of an aluminum nitride sintered body is preferably not less than $3.1125 \times 10^{-10}$ m. This makes it possible to further increase the volume resistivity.

The average particle size of the aluminum nitride sintered body is preferably not less than 0.3 µm. This makes it possible to obtain the aluminum nitride sintered body having higher volume resistance in the high-temperature, high-voltage environment.

The volume resistivity (JIS C2141) of the aluminum nitride sintered body in a vacuum at 200° C. is preferably not less than $1 \times 10^{15}$ Ωcm one minute after voltage application of 2 kV/mm. In particular, the volume resistivity thereof in the vacuum at 200° C. is more preferably not less than $1 \times 10^{15}$ Ωcm one minute after voltage application of 4 kV/mm. This makes it possible to apply the high voltage. Accordingly, for example, in the case where the aluminum nitride sintered body is used as the electrostatic chuck, it becomes possible to obtain a sufficient clamping force. This is because the clamping force (Coulomb force) increases in proportion to a voltage applied.

Moreover, the thermal conductivity (JIS R1611) of the aluminum nitride sintered body is preferably not less than 30 W/mK. This makes it possible to obtain the aluminum nitride sintered body having the thermal conductivity of not less than those of general alumina sintered bodies. In particular, the thermal conductivity of the aluminum nitride sintered body is suitably not less than 50 W/mK.

Furthermore, an open porosity of the aluminum nitride sintered body is preferably not more than 0.1%, more preferably not more than 0.05%. This makes it possible to further increase the volume resistivity of the aluminum nitride sintered body.

(Manufacturing Method)

The above-described aluminum nitride sintered body can be manufactured by molding into a compact, the raw material powder containing the aluminum nitride raw material powder, 0.5 to 3.0 mol % magnesium on a magnesium oxide basis, and 0.5 to 1.5 mol % yttrium on a yttrium on wide as is and entering the compact at a temperature of not more than 1750° C.

Specifically, magnesium oxide and yttrium oxide are weighed out so that the amounts of magnesium and yttrium fall within the above-described ranges, and the magnesium oxide and the yttrium oxide are mixed with the aluminum nitride powder, which is a primary constituent, thus preparing the raw material powder. Alternatively, as precursors to magnesium oxide and yttrium oxide, compounds which generate magnesium oxide and yttrium oxide by heating, such as magnesium nitrate, magnesium sulfate, magnesium oxalate, yttrium nitrate, yttrium sulfate, and yttrium oxalate, may be added to the aluminum nitride raw material powder. The precursors to oxide magnesium and yttrium oxide may be added thereto in a powder state. Alternatively, a solution obtained by dissolving compounds such as magnesium nitrate, magnesium sulfate, yttrium nitrate, and yttrium sulfate in a solvent may be added to the aluminum nitride raw material powder.

It should be noted that a mixing might be any of wet and dry processes. In the case where wet mixing is used, drying is performed after the mixing to obtain the raw material powder. For example, in the mixing, the wet mixing is performed for four hours using isopropyl alcohol as a solvent medium and using a pot and balls. After the mixing, slurry is taken out and dried in a nitrogen atmosphere at 110° C. Further, a dried powder is subjected to heat treatment in an atmospheric environment at 450° C. for five hours, whereby carbon constituents mixed therein during the wet mixing are burned off. Thus, the raw material powder is prepared.

To the raw material powder, titanium oxide or the like, such as oxide, containing transition metal, can be added in order to blacken the aluminum nitride sintered body. It should be noted, however, that the total amount of transition metal elements in the raw material powder for the aluminum nitride sintered body is preferably not more than 0.3 mol % on the oxide basis.

Further, an average primary particle size of the aluminum nitride raw material powder is preferably not more than 0.5 µm. This makes it possible to further increase the volume resistivity of the aluminum nitride sintered body because the average particle size of the aluminum nitride sintered body becomes not more than 1.0 µm. Although the average particle size of the aluminum nitride raw material powder does not particularly have a lower limit, the lower limit of, for example, not less than 0.1 μm can be placed thereon. The reason is as follows: if the average primary particle size of the aluminum nitride raw material powder becomes less than 0.1 μm, a reactivity thereof with moisture and oxygen in the air becomes very high, and the amount of oxygen in the raw material powder greatly varies; therefore, it becomes difficult to control a composition, and further there is a possibility that the volume resistivity may be lowered. Furthermore, a bulk density becomes low, and therefore there is a possibility that problems including deterioration in molding characteristics may occur.

Moreover, a specific surface area of the aluminum nitride raw material powder is preferably not less than 7 $m^2/g$. This makes it possible to further increase the volume resistivity of the sintered body because the average particle size of the sintered body becomes not more than 1.0 μm. Although the specific surface area of the aluminum nitride raw material powder does not particularly have an upper limit, the upper limit of, for example, not more than 30 $m^2/g$ can be placed thereon. The aluminum nitride raw material powder having the specific surface area of more than 30 $m^2/g$ has very high reactivity with moisture and oxygen in the air, and the amount of oxygen in the raw material powder greatly varies. Accordingly, it becomes difficult to control the composition, and further there is a possibility that the volume resistivity may be lowered. Furthermore, the bulk density becomes low, and therefore there is a possibility that problems including deterioration in molding characteristics may occur.

It should be noted that in the case where high priority is given to increasing the volume resistivity of the aluminum nitride sintered body, the amount of magnesium contained in the raw material powder is preferably 0.8 to 3.0 mol % on the magnesium oxide basis. On the other hand, in the case where high priority is given to increasing the thermal conductivity, the amount of magnesium contained in the raw material powder is preferably 0.5 to 1.5 mol % on the magnesium oxide basis.

The prepared raw material powder is preferably molded by die pressing or the like to prepare a compact. For example, the raw material powder is uniaxially pressurized and molded with a pressing pressure of 20 MPa, thus preparing a disk-shaped compact.

It should be noted that slurry might be prepared from the contained raw material powder and granulated to prepare a compact. Specifically, a binder, water, a dispersing agent, and the like are added to and mixed with the prepared raw material power, thus preparing slurry. The slurry is granulated by spray granulation or the like, thus preparing granules. Using the granules, a compact is prepared by a molding method such as die molding, cold isostatic pressing (CIP), and slip casting.

The prepared compact is preferably sintered in an inert gas atmosphere at a temperature of not more than 1750° C. If a sintering temperature exceeds 1750° C., the particle sizes of the aluminum nitride sintered body become large, and the volume resistivity decreases. More preferable the sintering temperature is 1600° C. to 1700° C. This makes it possible to further increase the volume resistivity of the aluminum nitride sintered body obtained. As to holding time at maximum temperature in sintering, a time of not less than 30 minutes is acceptable. More preferable holding time is one hour to four hours. This makes it possible to increase the volume resistivity of the aluminum nitride sintered body obtained. As the inert gas atmosphere, a nitrogen gas atmosphere, an argon gas atmosphere, or the like can be used.

The sintering method is not limited, but it is preferable that hot pressing be used. This makes it possible to obtain a dense aluminum nitride sintered body and to further increase the volume resistivity of the aluminum nitride sintered body obtained. The open porosity of the dense aluminum nitride sintered body obtained by hot pressing is suitably not more than 0.1%, more preferably not more than 0.05%. For example, the prepared compact is sintered under a pressing pressure of 20 MPa under the following conditions: when the temperature is from room temperature generally to 1000° C. but occasionally to 1500° C., an atmosphere is a vacuum; when the temperature is from 1000° C. or 1500° C. to maximum temperature, nitrogen gas of 0.15 MPa is introduced; and the maximum temperature is 1600° C. to 1750° C. and maintained for two to four hours.

As described above, the aluminum nitride sintered body having high volume resistance in the high-temperature, high-voltage environment can be obtained by molding, into a compact, raw material powder containing aluminum nitride raw material powder, 0.5 to 3.0 mol % magnesium on the magnesium oxide basis, and 0.5 to 1.5 mol % yttrium on the yttrium oxide basis; and by sintering the compact at a temperature of not more than 1750° C. Further, the composition, the open porosity, the bulk the density, the average particle size, and the like of the aluminum nitride sintered body can be appropriately adjusted by adjusting sintering conditions and the like such as the average particle size, composition, the sintering temperature, sintering time, sintering method, and the like of the raw material powder in the above-described manufacturing condition range. As a result, the thermal conductivity, volume resistivity, and the like of the aluminum nitride sintered body obtained can be appropriately adjusted.

(Semiconductor Manufacturing Member)

The aluminum nitride sintered body of this embodiment can be applied to various semiconductor manufacturing members for which high volume resistance is required in high-temperature, high-voltage environments. For example, the semiconductor manufacturing member can be provided which is at least partially constituted by the aluminum nitride sintered body of the present invention (essentially containing aluminum nitride, containing 0.4 to 2.5 wt % magnesium and 2.0 to 5.0 wt % yttrium, and having the average particle size of not more than 1.0 μm) and in which a metal member is buried. Such the semiconductor manufacturing member makes it possible to provide as the semiconductor manufacturing member an aluminum nitride sintered body having characteristics in which volume resistance is high in an appropriate high-temperature, high-voltage environment.

For example, the electrostatic chuck can be obtained as the semiconductor manufacturing member by forming at least part of the electrostatic chuck from the aluminum nitride sintered body of the present invention (consisting primarily of aluminum nitride, containing 0.4 to 2.5 wt % magnesium and 2.0 to 5.0 wt % yttrium, and having the average particle size of not more than 1.0 μm) and burying the metal member as the electrostatic electrode in the electrostatic chuck.

For example, a heater can be obtained as the semiconductor manufacturing member by forming at least part of the heater from the aluminum nitride sintered body of the present invention (essentially aluminum nitride, containing 0.4 to 2.5 wt % magnesium and 2.0 to 5.0 wt % yttrium, and having the average particle size of not more than 1.0 μm) and burying the metal member as a resistance heating element in the heater.

For example, a susceptor can be obtained as the semiconductor manufacturing member by forming at least part of the susceptor from the aluminum nitride sintered body of the present invention (essentially containing aluminum nitride, containing 0.4 to 2.5 wt % magnesium and 2.0 to 5.0 wt % yttrium, and having the average particle size of not more than 1.0 µm) and burying the metal member as an RF electrode in the susceptor.

OTHER EMBODIMENTS

Although the present invention has been described using the above-described embodiment, statements constituting part of the present disclosure should not be understood to limit the present invention. Various alternate embodiments, examples, and operational techniques should become apparent to those skilled in the art from the present disclosure.

For example, the aluminum nitride sintered body of this embodiment is in the form of very fine particles and has the average particle size of not more than 1.0 µm. Accordingly, a flat surface is easily obtained. Thus, the aluminum nitride sintered body of this embodiment can be favorably used as a member such as a mold material for which flatness is required.

Further, the aluminum nitride sintered body of this embodiment is a material which maintains a very high volume resistivity in a high-temperature, high-voltage environment, and therefore can be suitably used as a member such as electric porcelain.

Various modifications will become possible for those skilled in the art after receiving the teachings of the present disclosure without departing from the scope thereof.

EXAMPLES

Next, the present invention will be described in more detail using examples. However, the technical scope of the present invention should not be understood as limited to the examples.

(Aluminum Nitride Sintered Body)

Examples 1 to 12, Comparative Examples 1 to 4

An aluminum nitride power, a magnesium oxide powder, a yttrium oxide powder, and the like were weighed out so that the composition ratio shown in table 1 is obtained, and mixed, thus preparing raw material powder. It should be noted that an average particle size of aluminum nitride was made to be 0.2 µm. Specifically, the wet mixing was performed for four hours using isopropyl alcohol as a solvent medium and using a pot and balls. Slurry after the mixing was taken out and dried in a nitrogen atmosphere at 110° C. Further, a dried powder was subjected to heat treatment in an atmospheric environment at 450° C. for five hours, whereby carbon constituents mixed therein during the wet mixing were burned off. Thus, raw material powder was prepared. It should be noted that for all powders such as aluminum nitride, magnesium oxide, yttrium oxide, ytterbium oxide, and titanium oxide, the proportions (mol%) of powders blended are proportions calculated by ignoring the amounts of impurities contained therein.

The raw material powder was uniaxially pressurized and molded with a pressing pressure of 20 MPa by die pressing, thus preparing a disk-shaped compact having a diameter of 50 mm to 100 mm and a thickness of approximately 20 mm. The compact was put in a carbon mold, placed in a nitrogen atmosphere, and sintered by hot pressing at the sintering temperature shown in table 2 for the holding time shown therein, thus preparing an aluminum nitride sintered body.

The aluminum nitride sintered body obtained was processed, and the following evaluations (1) to (9) were performed:

(1) The contents of Y, Mg, and Ti were determined by inductively coupled plasma (ICP) spectrometry.
(2) The contents of oxygen and carbon were determined by inert gas fusion infrared absorption.
(3) An open porosity and a bulk density were measured by Archimedes' method using pure water as a medium.
(4) The volume resistivity was measured by a method according to JIS C2141 from room temperature to approximately 200° C. under vacuum. Specifically, the test sample was in a 50mm diameter×0.5 mm thickness shape or a 50×50×0.5 mm shape. A main electrode, a guard electrode, and an application electrode were formed from silver so that a diameter of the main electrode, the inner and outer diameters of the guard electrode, and the diameter of the application electrode be comp 20 mm, 30 mm, 40 mm, and 40 mm, respectively. A current one minute after voltage application of 2 kV/mm (occasionally 4 kV/mm) was read, and a volume resistivity was calculated.
(5) The thermal conductivity was measured by a laser flash method according to JIS R1611.
(6) The average particle size of aluminum nitride particles was measured. Specifically, the aluminum nitride sintered body was polished, and a microstructure was observed with an electron microscope. Then, on an SEM photograph obtained, an arbitrary number of lines were drawn, and the average intercept length was found. The accuracy increases with an increasing number of particles intersecting the lines. Accordingly, the number of lines was set at such a level that approximately 60 particles intersect the lines, though depending on particle sizes. The average particle size was estimated by multiplying the average intercept length by a coefficient determined by the shapes of particles. It should be noted that particles were assumed to be spherical in these examples and that the coefficient was set to 1.5.
(7) A crystal phase was determined by using a rotating-anode type X-ray diffractometer, "RINT" manufactured by Rigaku Corporation, under the following conditions: CuKα, 50 kV, 300 mA, and 2θ=10–70°.
(8) Lattice parameters were measured. Specifically, from an XRD profile measured with the X-ray diffractometer, lattice parameter were calculated using a whole-powder-pattern fitting (WPPF) program.

First, Al2O3 powder of which lattice parameters were known was mixed as an internal standard with powder obtained by crushing the sintered body of each example with a weight ratio of 1:1, and a CuKα ray from which a CuKβ ray was removed with a monochromater was applied to a sample, thus measuring a profile. The measurement was performed with a rotating-anode X-ray diffractometer of the "RINT-2000 series," manufactured by Rigaku Corporation, under the following conditions: 50 kV, 300 mA, and 2θ=30–120°.

Further, using a program, "WPPF," which can be included as an option in this diffractometer, profile fitting was performed to derive lattice parameters. With "WPPF," precise calculation can be performed if approximate values of lattice parameters of the internal standard and aluminum nitride are known.

In precise calculation, WPPF was started, and a fitting range 2θ was designated based on the measured profile. Subsequently, fitting was performed semi-automatically, and then manual fitting was performed. In the manual precise calculation, precise calculations were performed until a calculated profile coincides with the measured profile (Rwp (standard deviation)=not more than 0.1), by designating whether each of parameters, which are a background intensity, a peak intensity, lattice parameters, a half-value width, a peak asymmetry parameter, a low-angle profile intensity attenuation factor, and a high-angle profile intensity attenuation factor, is "fixed" or "variable", for each calculation. By this precise calculation, highly reliable lattice parameters were obtained.

It should be noted that WPPF is described in detail in the following paper: H. Toraya, "Whole-Powder-Pattern Fitting Without Reference to a Structural Model: Application to X-ray Powder Diffractometer Data," J. Appl. Cryst. 19, 440-447 (1986).

The results of evaluations (1) to (8) obtained after processing the aluminum nitride sintered body are shown in table 2 to 4.

TABLE 1

| | Raw material powder | | | | | |
|---|---|---|---|---|---|---|
| | Aluminum nitride powder | | | | | |
| | Oxygen content wt % | Specific surface area m$^2$/g | MgO mol % | $Y_2O_3$ mol % | $Yb_2O_3$ mol % | $TiO_2$ mol % |
| Example 1 | 1.23 | 9.7 | 1.00 | 0.89 | — | — |
| Example 2 | 1.23 | 9.7 | 1.98 | 0.88 | — | — |
| Example 3 | 1.23 | 9.7 | 2.93 | 0.87 | — | — |
| Example 4 | 1.23 | 10.6 | 1.97 | 0.88 | — | 0.25 |
| Example 5 | 1.23 | 10.6 | 2.93 | 0.87 | — | 0.25 |
| Example 6 | 1.23 | 9.7 | 1.97 | 1.23 | — | — |
| Example 7 | 1.23 | 9.7 | 1.98 | 0.88 | — | — |
| Example 8 | 1.23 | 9.7 | 1.00 | 0.89 | — | — |
| Example 9 | 1.23 | 9.7 | 1.98 | 0.88 | — | — |
| Example 10 | 1.23 | 9.7 | 1.98 | 0.53 | — | — |
| Example 11 | 1.23 | 9.7 | 0.80 | 0.89 | — | — |
| Example 12 | 1.23 | 9.7 | 1.49 | 0.89 | — | — |
| Comparative examples 1 | 1.23 | 9.7 | 1.99 | — | — | — |
| Comparative examples 2 | 1.23 | 9.7 | 1.98 | — | 0.51 | — |
| Comparative examples 3 | 1.23 | 9.7 | 1.98 | 0.88 | — | — |
| Comparative examples 4 | 0.97 | 3.4 | — | 0.90 | — | — |

TABLE 2

| | Sintering condition | | Chemical analysis value | | | | |
|---|---|---|---|---|---|---|---|
| | Maximum temperature ° C. | Holding time h | Mg content wt % | Y content wt % | Ti content wt % | O content wt % | C content wt % |
| Example 1 | 1700 | 4 | 0.56 | 3.45 | — | 3.32 | 0.077 |
| Example 2 | 1700 | 4 | 1.13 | 3.43 | — | 3.01 | 0.078 |
| Example 3 | 1750 | 4 | 2.26 | 3.40 | — | 3.56 | 0.078 |
| Example 4 | 1700 | 2 | 1.13 | 3.46 | 0.28 | 3.52 | 0.027 |
| Example 5 | 1700 | 2 | 2.30 | 3.58 | 0.28 | 3.68 | 0.027 |
| Example 6 | 1700 | 4 | 1.14 | 4.89 | — | 4.08 | 0.075 |
| Example 7 | 1600 | 4 | 1.15 | 3.56 | — | 3.64 | 0.075 |
| Example 8 | 1750 | 4 | 0.55 | 3.49 | — | 3.59 | 0.076 |
| Example 9 | 1700 | 2 | 1.12 | 3.46 | — | 3.23 | 0.077 |
| Example 10 | 1700 | 4 | 1.11 | 2.05 | — | 2.89 | 0.073 |
| Example 11 | 1700 | 4 | 0.43 | 3.37 | — | 3.11 | 0.078 |
| Example 12 | 1700 | 4 | 0.92 | 3.46 | — | 3.31 | 0.077 |
| Comparative examples 1 | 1800 | 4 | 1.19 | — | — | 4.13 | 0.068 |
| Comparative examples 2 | 1600 | 4 | 1.13 | — | — | 3.48 | 0.077 |
| Comparative examples 3 | 1800 | 4 | 1.11 | 3.52 | — | 3.39 | 0.071 |
| Comparative examples 4 | 1800 | 4 | — | 3.50 | — | 3.00 | 0.030 |

TABLE 3

| | | | characteristic | | | |
|---|---|---|---|---|---|---|
| | Open porosity % | Bulk density g/cm$^3$ | Volume resistivity at 200° C. | | Thermal conductivity W/mK | Average particle size of AlN μm |
| | | | 2 kV/mm Ω · cm | 4 kV/mm Ω · cm | | |
| Example 1 | 0.01 | 3.34 | 2.1 × 10$^{15}$ | 1.9 × 10$^{15}$ | 56 | 0.7 |
| Example 2 | 0.00 | 3.37 | 1.8 × 10$^{15}$ | 1.6 × 10$^{15}$ | 48 | 0.6 |
| Example 3 | 0.01 | 3.33 | 1.4 × 10$^{15}$ | 1.2 × 10$^{15}$ | 32 | 0.4 |
| Example 4 | 0.04 | 3.35 | 1.1 × 10$^{15}$ | 1.1 × 10$^{15}$ | 41 | 0.5 |
| Example 5 | 0.01 | 3.34 | 1.9 × 10$^{15}$ | 1.3 × 10$^{15}$ | 31 | 0.4 |
| Example 6 | 0.02 | 3.36 | 1.0 × 10$^{15}$ | 1.0 × 10$^{15}$ | 45 | 0.5 |

TABLE 3-continued

| | characteristic | | | | | |
|---|---|---|---|---|---|---|
| | Open porosity % | Bulk density g/cm³ | Volume resistivity at 200° C. | | Thermal conductivity W/mK | Average particle size of AlN μm |
| | | | 2 kV/mm Ω·cm | 4 kV/mm Ω·cm | | |
| Example 7 | 0.01 | 3.34 | $1.0 \times 10^{15}$ | $1.0 \times 10^{15}$ | 37 | 0.3 |
| Example 8 | 0.02 | 3.34 | $1.8 \times 10^{15}$ | $1.5 \times 10^{15}$ | 49 | 1.0 |
| Example 9 | 0.00 | 3.34 | $2.8 \times 10^{15}$ | $1.7 \times 10^{15}$ | 37 | 0.6 |
| Example 10 | 0.00 | 3.30 | $2.3 \times 10^{15}$ | $1.7 \times 10^{15}$ | 41 | 0.6 |
| Example 11 | 0.00 | 3.34 | $1.8 \times 10^{15}$ | $1.4 \times 10^{15}$ | 55 | 0.8 |
| Example 12 | 0.00 | 3.34 | $1.4 \times 10^{15}$ | $1.2 \times 10^{15}$ | 39 | 0.7 |
| Comparative examples 1 | 0.02 | 3.28 | $4.3 \times 10^{13}$ | — | 63 | 1.6 |
| Comparative examples 2 | 0.01 | 3.34 | $9.4 \times 10^{12}$ | — | 32 | 0.6 |
| Comparative examples 3 | 0.01 | 3.33 | $6.4 \times 10^{14}$ | — | 47 | 1.2 |
| Comparative examples 4 | 0.02 | 3.34 | $1.0 \times 10^{13}$ | — | 160 | 3.0 |

TABLE 4

| | characteristic | | |
|---|---|---|---|
| | a-axis length Å | c-axis length Å | Crystal phase (AlN is excluded) |
| Example 1 | 3.1125 | 4.9894 | $Y_2O_3 \cdot Al_2O_3$, $3Y_2O_3 \cdot 5Al_2O_3$, $MgAl_2O_4$ |
| Example 2 | 3.1128 | 4.9794 | $Y_2O_3 \cdot Al_2O_3$, $3Y_2O_3 \cdot 5Al_2O_3$, $MgAl_2O_4$ |
| Example 3 | 3.1141 | 4.9816 | $Y_2O_3 \cdot Al_2O_3$ |
| Example 4 | 3.1133 | 4.9809 | $Y_2O_3 \cdot Al_2O_3$, $MgAl_2O_4$ |
| Example 5 | 3.1133 | 4.9815 | $Y_2O_3 \cdot Al_2O_3$, $MgAl_2O_4$ |
| Example 6 | 3.1141 | 4.9811 | $2Y_2O_3 \cdot Al_2O_3$, $Y_2O_3 \cdot Al_2O_3$, |
| Example 7 | 3.1128 | 4.9807 | $Y_2O_3 \cdot Al_2O_3$, $3Y_2O_3 \cdot 5Al_2O_3$, $MgAl_2O_4$ |
| Example 8 | 3.1134 | 4.9806 | $Y_2O_3 \cdot Al_2O_3$, $3Y_2O_3 \cdot 5Al_2O_3$, $MgAl_2O_4$ |
| Example 9 | 3.1135 | 4.9813 | $Y_2O_3 \cdot Al_2O_3$, $3Y_2O_3 \cdot 5Al_2O_3$, $MgAl_2O_4$ |
| Example 10 | 3.1135 | 4.9810 | $Y_2O_3 \cdot Al_2O_3$, $MgAl_2O_4$ |
| Example 11 | 3.1127 | 4.9797 | $Y_2O_3 \cdot Al_2O_3$, $3Y_2O_3 \cdot 5Al_2O_3$ |
| Example 12 | 3.1134 | 4.9807 | $Y_2O_3 \cdot Al_2O_3$, $MgAl_2O_4$ |
| Comparative examples 1 | 3.1117 | 4.9786 | $MgAl_2O_4$ |
| Comparative examples 2 | 3.1131 | 4.9809 | $3Yb_2O_3 \cdot 5Al_2O_3$, $MgAl_2O_4$ |
| Comparative examples 3 | 3.1130 | 4.9800 | $Y_2O_3 \cdot Al_2O_3$, $3Y_2O_3 \cdot 5Al_2O_3$, $MgAl_2O_4$ |
| Comparative examples 4 | 3.1117 | 4.9812 | $2Y_2O_3 \cdot Al_2O_3$, $Y_2O_3 \cdot Al_2O_3$ |

The aluminum nitride sintered bodies of examples 1 to 12 are aluminum nitride sintered bodies obtained by sintering, in the range of 1600 to 1750° C., raw material powder containing aluminum nitride raw material powder having the average particle size of 0.2 μm and a specific surface area of 9.7 m²/g or 10.6 m²/g, 0.5 to 3.0 mol % magnesium on the magnesium oxide basis, and 0.5 to 1.5 mol % yttrium on a yttrium oxide basis. The aluminum nitride sintered bodies of examples 1 to 12 have very high bulk densities of not less than 3.3 g/Cm³. Thus, very dense aluminum nitride sintered bodies were obtained.

Further, in each of the aluminum nitride sintered bodies of examples 1 to 12, the average particle size of aluminum nitride is 0.3 to 1.0 μm, and the volume resistivity at 200° C. during voltage application of 2 kV/mm is not less than $1 \times 10^{15}$ Ω·cm. Thus, the volume resistivities are higher than those of the aluminum nitride sintered bodies of comparative examples 1 to 4, which have volume resistivities of $9 \times 10^{12}$ to $6 \times 10^{14}$ Ω·cm. In particular, example 9 is an aluminum nitride sintered body which contains aluminum nitride, 1.12 wt % magnesium, and 3.46% yttrium and which was sintered at 1700° C. for two hours, and the volume resistivity increased to $3 \times 10^{15}$ Ω·cm.

Moreover, example 1 is an aluminum nitride sintered body which contains aluminum nitride, 0.56 wt % magnesium, and 3.45% yttrium and which was sintered at 1700° C. for four hours. The volume resistivity is $2 \times 10^{15}$ Ω·cm, and the thermal conductivity is 56 W/mK. Thus, example 1 has high volume resistance and high thermal conductivity. FIG. 1 is the result of SEM observation on a sample obtained by performing mirror polishing and thermal etching on the aluminum nitride sintered body of examples 1.

Figure 2:
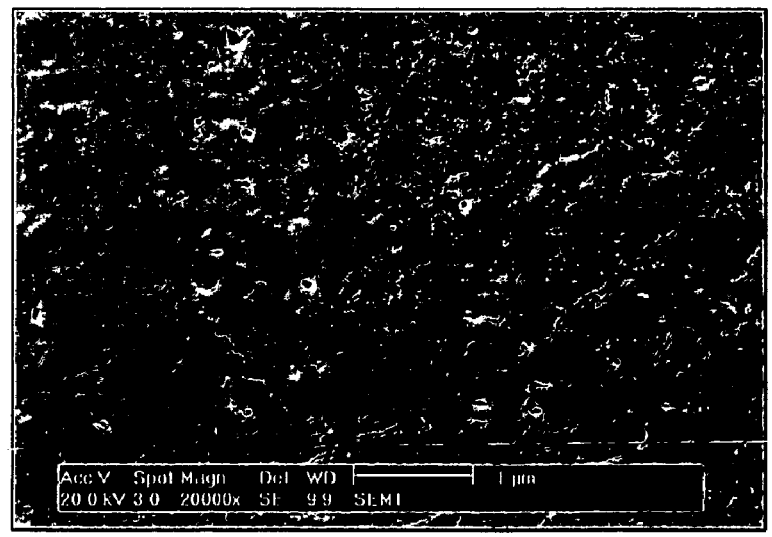
FIG. 2 is a photograph substituted for a drawing which shows the microstructure of an aluminum nitride sintered body of example 7.

FIG. 2 is the result of SEM observation on a sample obtained by performing mirror polishing and thermal etching on the aluminum nitride sintered body of example 7. In example 7, aluminum nitride particles are very fine, and the average particle size of aluminum nitride is 0.3 μm. The particle size is smallest among those of examples 1 to 12.

Further, the thermal conductivities of the aluminum nitride sintered bodies of examples 1 to 12 are not less than 31 W/mK and higher than that of alumina.

On the other hand, comparative example 1 is an aluminum nitride sintered body obtained by sintering raw material powder containing aluminum nitride, 1.19 wt % magnesium, and no yttrium at 1800° C., which is higher than 1750° C. A grain boundary phase containing yttrium does not exist, and the average particle size of aluminum nitride is not less than 1.0 μm. Accordingly, the volume resistivity is inferior.

Comparative example 2 is an aluminum nitride sintered body obtained by sintering raw material powder containing ytterbium oxide, aluminum nitride, 1.13 wt % magnesium, and no yttrium at 1600° C. A grain boundary phase containing yttrium does not exist. Accordingly, the volume resistivity is very inferior.

Comparative example 3 is an aluminum nitride sintered body obtained by sintering raw material powder containing aluminum nitride, 1.11 wt % magnesium, and 3.52 wt % yttrium at 1800° C., which is higher than 1750° C. The average particle size of aluminum nitride is not less than 1.0 μm. Accordingly, the volume resistivity is inferior.

Comparative example 4 is an aluminum nitride sintered body obtained by sintering raw material powder containing aluminum nitride, 3.5 wt % yttrium, and no magnesium at 1800° C., which is higher than 1750° C. The thermal conductivity is high, but the volume resistivity is very inferior.

What is claimed is:

1. An aluminum nitride sintered body consisting essentially of aluminum nitride, 0.4 to 2.5 wt % magnesium and 2.0 to 5.0 wt % yttrium, and having an average particle size of not more than 1.0 µm.

2. The aluminum nitride sintered body of claim 1, wherein an a-axis length of lattice parameters is not less than $3.1125 \times 10^{-10}$ m.

3. The aluminum nitride sintered body of claim 1, wherein the average particle size of the aluminum nitride sintered body is not less than 0.3 µm.

4. The aluminum nitride sintered body of claim 1, wherein a volume resistivity of the aluminum nitride sintered body in a vacuum at 200°C. is not less than $1 \times 10^{15}$ Ω·cm one minute after a voltage application of 2 kV/min.

5. The aluminum nitride sintered body of claim 1, wherein a thermal conductivity of the aluminum nitride sintered body is not less than 30 W/mK.

6. A semiconductor manufacturing member comprising the aluminum nitride sintered body of claim 1, wherein the aluminum nitride sintered body constitutes at least part of the semiconductor manufacturing member.

* * * * *